(12) United States Patent
Spaulding et al.

(10) Patent No.: US 8,325,474 B2
(45) Date of Patent: Dec. 4, 2012

(54) COMPUTER COMPONENT VIBRATION ISOLATION

(75) Inventors: Jeff Spaulding, Sunnyvale, CA (US); Everildo Guia Aguilar, Mountain View, CA (US); Michael Lau, San Francisco, CA (US)

(73) Assignee: Google Inc., Mountain View, CA (US)

( * ) Notice: Subject to any disclaimer, the term of this patent is extended or adjusted under 35 U.S.C. 154(b) by 43 days.

(21) Appl. No.: 13/071,406

(22) Filed: Mar. 24, 2011

(65) Prior Publication Data
US 2012/0243171 A1    Sep. 27, 2012

(51) Int. Cl.
*G06F 1/16* (2006.01)
(52) U.S. Cl. .............. 361/679.34; 370/351; 165/288; 711/152
(58) Field of Classification Search .......... 370/355, 370/276, 352, 248, 392, 351; 165/104.11, 165/104.33, 80.4, 80.3, 288; 361/679.02, 361/679.53, 679.48, 679.47, 679.32, 679.33, 361/679.37, 679.4, 679.54, 679.31, 752, 361/737, 759, 756, 699, 801, 704, 698, 695; 439/629, 660, 196, 540.1; 711/170, 154, 711/111, 150, 152, 112
See application file for complete search history.

(56) References Cited

U.S. PATENT DOCUMENTS

| 2002/0054480 A1* | 5/2002 | Jitaru ........................... 361/704 |
| 2008/0007865 A1 | 1/2008 | Orriss et al. |
| 2008/0117614 A1* | 5/2008 | Qin et al. ...................... 361/807 |
| 2010/0276224 A1* | 11/2010 | Wei .............................. 181/121 |

FOREIGN PATENT DOCUMENTS
WO   WO 02/09096   1/2002

OTHER PUBLICATIONS

Australian Office Action for Application No. 2011244843, dated Dec. 12, 2011, 3 pages.

* cited by examiner

*Primary Examiner* — Hung Duong
(74) *Attorney, Agent, or Firm* — Fish & Richardson P.C.

(57) ABSTRACT

A computer component mounting assembly includes a base plate, a carrier configured to receive a vibration sensitive computer component, and a vibration isolation system including three isolators connecting the carrier to the base plate. The three isolators are spaced at different angular positions around a central point, and the vibration isolation system is configured such that the vibration isolation system has a rotational natural frequency about the central point of less than 45 Hz.

39 Claims, 4 Drawing Sheets

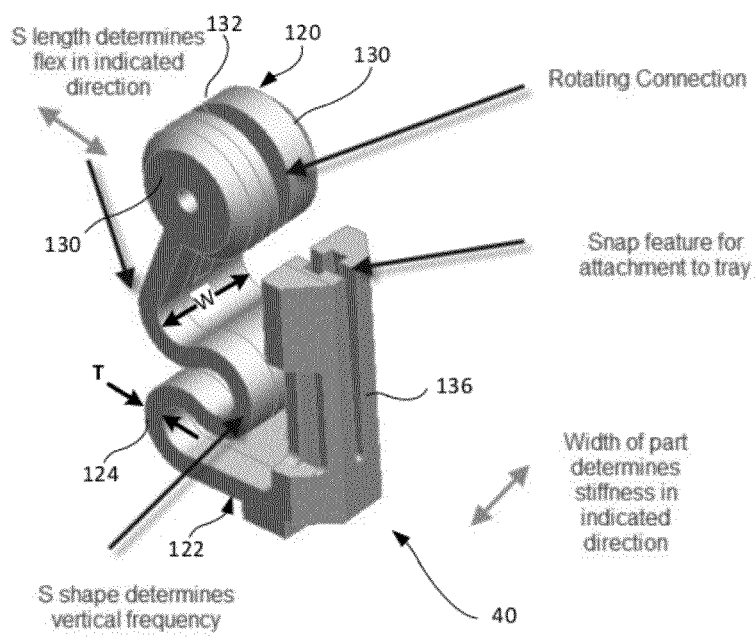
FIG. 5A
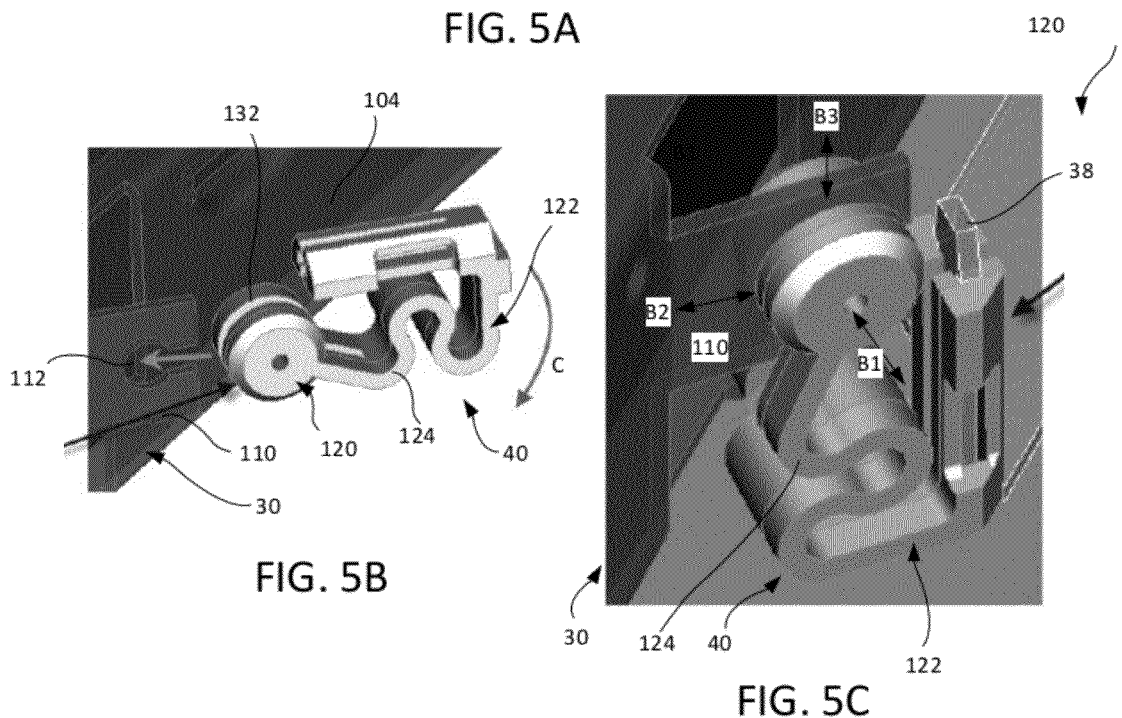
FIG. 5B
FIG. 5C

COMPUTER COMPONENT VIBRATION ISOLATION

TECHNICAL FIELD

This disclosure relates to isolation of computer components, e.g., hard disks, from vibration.

BACKGROUND

A typical computer component with moving parts, e.g., a hard disk drive, is sensitive to vibration. For example, as vibration of a hard disk drive increases, read and write off track errors will also increase. With enough vibration damage to the media can happen. A hard disk drive is typically designed by the manufacturer not to exceed a specified latency interval due to self-induced vibration. This can be stated as sequential write throughput. For example, a hard disk drive is typically designed to account for vibration caused by rotation of the platter of the hard disk drive, movement of the read/write head, and the like.

However, when multiple components with moving parts are mounted on a common support structure, e.g., a motherboard or a tray in a server rack, then the vibrational energy from one component can be transmitted to another component. For example, if multiple hard disk drives are mounted on a common support structure, the vibrational energy from one hard disk drive can be transferred to another hard disk drive. As another example, fans are also a common source of vibrational energy. The increased vibration can increase the latency interval during read or write operations of the hard disk drive.

A technique to reduce the transmission of vibrational energy is to mount the components on the support structure using a viscous damping material, e.g., a viscoelastic material. In addition, components with greater resistance to vibration are available for purchase, but at higher cost.

SUMMARY

As noted above, one technique to isolate computer components from vibration is to mount the components using a viscous damping material. However, such mounting structures tends to be expensive. In addition, in some frequency ranges, a hard disk drive's performance is more sensitive, e.g., by a factor of 100 or more, to rotational vibration than translational vibration. Moreover, some recently manufactured low-cost disk drives are less sensitive to rotational vibration at lower frequencies than prior disk drives.

In view of the foregoing, the present disclosure sets forth various techniques to isolate a computer component, e.g., a hard disk drive, from rotational vibration. In addition, the present disclosure sets forth techniques to mount a computer component with a natural rotational frequency that is relatively lower than prior industry standard solutions, e.g., at frequencies of 15 to 25 Hz. Consequently, computer components can be effectively isolated from rotational vibration at frequencies at which some disk drives, e.g., recently introduced low cost disk drives, are sensitive, e.g., at frequencies above 50 Hz.

In one aspect, a computer component mounting assembly includes a base plate, a carrier configured to receive a vibration sensitive computer component, and a vibration isolation system including three isolators connecting the carrier to the base plate. The three isolators are spaced at different angular positions around a central point, and the vibration isolation system is configured such that the vibration isolation system has a rotational natural frequency about the central point of less than 45 Hz.

In another aspect, a hard disk mounting assembly may include a base plate, a carrier, a hard disk drive inserted in the carrier, the hard disk drive having a maximum spindle speed, and a vibration isolation system including three isolators connecting the carrier to the base plate. The three isolators are spaced at different angular positions around a central point. The vibration isolation system is configured such that the vibration isolation system has a rotational natural frequency about the central point equal to or less than one half of the maximum spindle speed of the hard disk drive.

In another aspect, a hard disk mounting assembly includes a base plate, a carrier configured to receive a hard disk drive, and three springs connecting the carrier to the base plate. The three springs are spaced at different angular positions around a central point. Each spring has a first spring constant in a first axis passing through the connector and the central point and a second spring constant in the second axis that is perpendicular to the first axis and parallel to the base plate. The first spring is greater than the second spring constant.

In another aspect, a vibration isolation system includes a base plate and three isolators connected to the base plate to support a carrier that receives a vibration sensitive computer component. The three isolators are spaced at different angular positions around a central point. The isolators are configured to have a rotational natural frequency about the central point of less than 45 Hz.

Implementations of the aspects may include one or more of the following features. Each isolator may be less flexible along a first axis passing through the isolator and the central point than along a second axis through the isolator that is perpendicular to the first axis and parallel to the base plate. Each isolator may be more flexible along the second axis than along a third axis through the isolator that is perpendicular to the base plate. Each isolator may be more flexible along the first axis than along the third axis. Four isolators may connect the carrier to the base plate. A first pair of the four isolators may be positioned on a first side of a center of the carrier, and a second pair of the four isolators may be positioned on an opposite second side of the center of the carrier. The isolators may be positioned at equal radial distances from the central point. The isolators may have the same stiffness. The isolators may be positioned at different radial distances from the central point, and the isolators may have different stiffnesses. The vibration isolation system may be configured such that the vibration isolation system has a vertical vibration natural frequency different than the rotational natural frequency and has a lateral vibration natural frequency different than the rotational natural frequency. The vibration isolation system may have a rotational natural frequency about the central point of less than 45 Hz. The vibration isolation system may be configured such that its lateral vibration natural frequency is greater than 20 Hz. The vibration isolation system may be configured such that its vertical vibration natural frequency is greater than 20 Hz. The vibration isolation system may be configured such that the vibration isolation system has a rotational natural frequency about the central point less than 30 Hz. The vibration isolation system may be configured such that the vibration isolation system has a rotational natural frequency about the central point between 15 and 25 Hz. The at least one of the isolators may include a flexure having an S-shaped cross-section in a plane perpendicular to a first axis passing through the at least one of the isolators and the central point. The flexure may have a width along the first axis and a thickness that is less than the width. The flexure may be a plastic material or steel. At least one of the isolators may include a first end pivotal attached to the carrier and a second end attached to the base plate. The carrier may include three tabs oriented in a plane perpendicular to the first axis, and the first end of each of the three isolators connects to an associated tab of the three tabs. Each isolator may fit to an associated tab with a slide and rotate connection. The carrier may include a bottom plate and two parallel side plates extending from opposite edges of the bottom plate, and the three tabs may extend at an angle from the side plates. Three pins may extend perpendicular from the base plate, and wherein the second end of each of the three isolators may connect to an associated pin of the three pins. Each isolator may snap fit to an associated pin. The vibration sensitive computer component may be a hard disk drive. The carrier may be configured to slidably receive the hard disk drive. A printed circuit board may be secured to the base plate. The printed circuit board may be oriented perpendicular to the base plate. A flexible power and data cabling may connect an end of the carrier to the printed circuit board. The vibration isolation system may suspend the carrier above the base plate such that air can flow through a gap between the carrier and the base plate. A thermal interface material may improve conduction of heat from the hard disk drive mounted in the carrier to the carrier. A plurality of fins may project from the carrier into the gap. The central point may be a geometric center of the carrier or a center of mass of the carrier and the vibration sensitive computer component. There may be a plurality of carriers and a plurality of sets of isolators, each carrier of the plurality of carriers may be configured to receive a hard disk drive, each set of isolators may include three isolators connecting an associated carrier of the plurality of carriers to the base plate, the three isolators may be spaced at different angular positions around a center of the associated carrier, and each isolator may be less flexible along a first axis passing through the isolator and the center of the associated carrier than along a second axis through the isolator that is perpendicular to the first axis and parallel to the base plate.

In another aspect, a hard disk mounting assembly includes a base plate having a top surface and four pins projecting perpendicularly from the top surface, a printed circuit board secured to the base plate, a carrier configured to receive a hard disk drive, flexible power and data cabling connecting an end of the carrier to the printed circuit board, and a vibration isolation system including four isolators connecting the carrier to the base plate. The carrier includes four tabs. The four isolators are spaced at different angular positions around a central point. Each isolator of the four isolators includes a flexure having an S-shaped cross-section in a plane perpendicular to a first axis passing through the isolator and the central point. The flexure has a width along the first axis and a thickness that is less than the width. A first end of each isolator fits to an associated tab of the four tabs with a slide and rotate connection. A second end of each isolator snap fits to an associated pin of the four pins. The vibration isolation system is configured such that the vibration isolation system has a rotational natural frequency about the central point less than 45 Hz, and the vibration isolation system is configured such that its vertical vibration natural frequency is greater than 20 Hz.

Implementations can have one or more of the following advantages. The mounting structure can isolate a computer component, e.g., a hard disk drive, from rotational vibration, e.g., at frequencies above 50 Hz. Latency can be reduced. The mounting structure can permit packing of computer components on a base plate with limited lateral spacing. The mounting structure can be compatible with existing constraints of vertical spacing, e.g., in a server rack.

The details of one or more implementations are set forth in the accompanying drawings and the description below. Other aspects, features and advantages will be apparent from the description and drawings, and from the claims.

DESCRIPTION OF DRAWINGS

FIG. 5A is a perspective view of an isolator.

FIG. 5B is a perspective view of an isolator being attached to a tab of a carrier.

FIG. 5C is a perspective view of an isolator attached to a tab of a carrier and to a pin on the base plate.

Like reference symbols in the various drawings indicate like elements.

DETAILED DESCRIPTION

Figure 1:
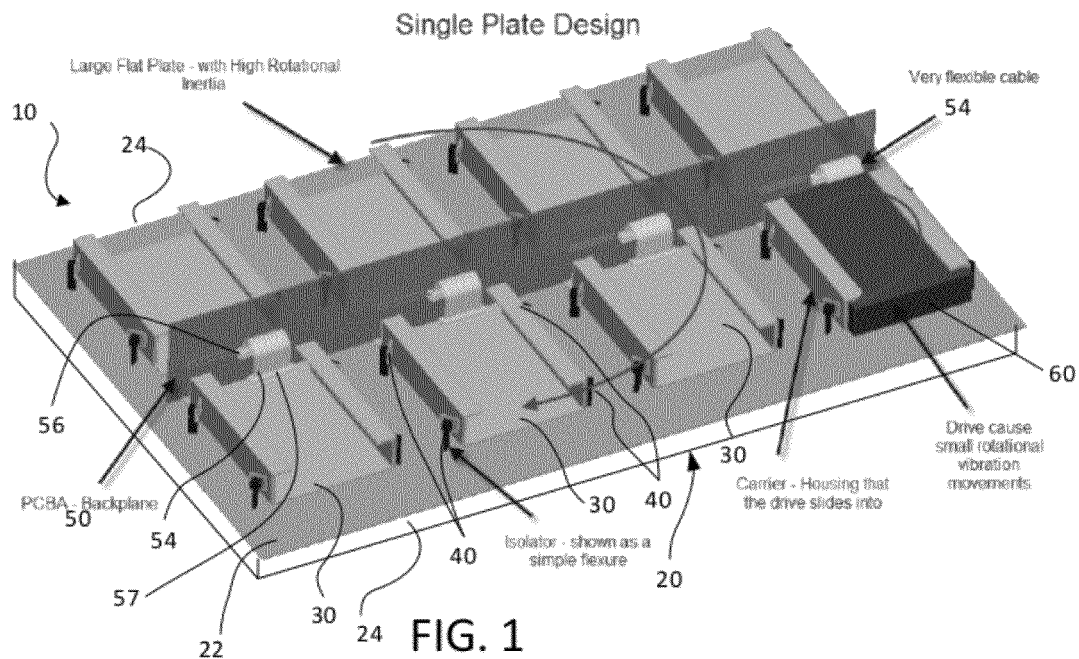
FIG. 1 is a perspective view of a hard disk mounting assembly.

Referring to FIG. 1, a hard disk mounting assembly 10 includes a base plate 20 and one or more hard disk carriers 30 supported on a face 22 of the base plate 20. Each carrier is supported on the base plate 20 by a vibration isolating assembly that includes a plurality of isolators 40. Each vibration isolating assembly is configured to provide an associated carrier 30 with a different, e.g., greater, isolation from rotational vibration than from translational vibration over a first frequency range. In particular, at least some, e.g., each, vibration isolating assembly can be tuned to a natural rotational frequency between 45 and 10 Hz, e.g., between 30 and 10 Hz, e.g., between 15 and 25 Hz, although other natural rotational frequencies could be selected depending upon the expected energy input. For example, the vibration isolating assembly can be tuned to a natural rotational frequency that is equal to or less than one-half the maximum spindle speed of the hard disk. Thus, for hard disk that nominally operates at 7200 rpms (120 Hz), the vibration isolating assembly can be tuned to a natural rotational frequency of 60 Hz or less. Consequently, the vibration isolating assembly is configured to isolate the carrier from rotational vibration at frequencies somewhat above the natural rotational frequency, e.g., above 40 Hz if the natural frequency is between 25 and 15 Hz.

In addition, each vibration isolating assembly can be tuned to provide lateral and vertical isolation at a different frequency than rotational isolation. In particular, at least some, e.g., each, vibration isolating assembly can be tuned to a natural vertical vibrational frequency of about 40 Hz, although other natural rotational frequencies could be selected depending upon the expected energy input. Consequently, the vibration isolating assembly is configured to isolate the carrier from vertical vibration at a higher or lower frequency range than the rotational vibration, e.g., 60 Hz and higher (this is can be advantageous if shipping is desired). The natural lateral frequency can be similar to or less than the natural rotational frequency.

The base plate 20 can be a rigid material, e.g., metal. The base plate 20 can be a tray that slides into a rack, e.g., a server rack, e.g., a 19-inch rack or a 23-inch rack. For example, the base plate 20 can have two opposing edges 24 configured to slidably engage two opposing rails of the rack. By increasing the size of the base plate 20, rotational inertial of the system can be increased, thus reducing rotational vibration of the system and reducing the likelihood of off track errors thus reducing latency and throughput.

The carriers 30 can be secured, e.g., detachably secured, on the base plate 20. The carriers 30 can be manually detachable from the base plate, e.g., by hand and without requiring tool or breaking of components. The carriers 30 can be a rigid material, e.g., metal, although other materials, e.g., plastic, are possible.

Figure 2:
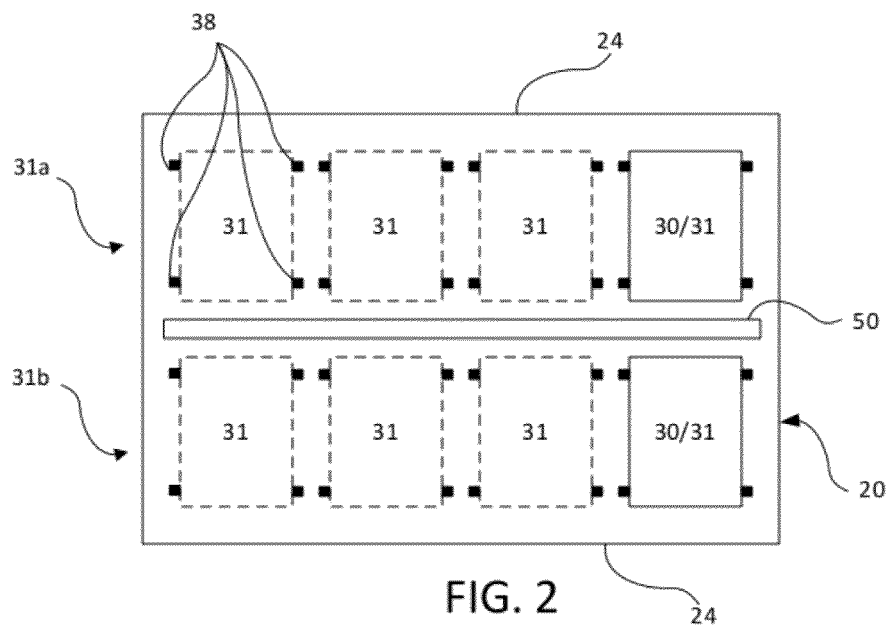
FIG. 2 is a top view of a hard disk mounting assembly.

Referring to FIG. 2, the locations 31 in which the carriers can be secured on the base plate 30 can be arranged in a regular array. The array can be a regular rectangular array with multiple rows 31a, 31b of positions 31 for the carriers 30, although other arrangements, such as other arrays, e.g., hexagonal packed arrays, or irregular positioning of the carriers on the base plate 20, are also possible. Although FIG. 1 illustrates eight carriers, an assembly could be constructed with just one carrier, or with a plurality of carriers, e.g., two to eight carriers. In addition, although FIG. 1 illustrates a 2×4 array, many other configurations are possible, e.g., just one row. In addition, although FIG. 1 illustrates each location in the array as having a carrier, it is possible for some locations in the array to lack a carrier, e.g., as shown in FIG. 2.

In some implementations, a plurality of pins 38 project from the base plate 20, e.g., project perpendicularly, e.g., vertically upward, from the face 22 of the base plate 20. The pins 38 can be used to set the positions of the isolators 40, and thus set the positions 31 of the carrier(s) 30 on the base plate 20. There can be a set of pins for each potential position of a carrier 30, e.g., an equal number of pins for each potential position for a carrier. The number of pins per potential carrier position can be equal to the number of isolators 40 used to connect a carrier 30 to the base plate 20. In the implementation shown in FIG. 1, there are four pins 38 and four isolators 40 per potential carrier position. However, in some implementations, there can be more or less than four isolators used to connect the carrier 30 to the base plate 20. In addition, in some implementations, more than one isolator can be connected to a single pin 38, e.g., two isolators connected to adjacent corners of two adjacent carriers could be connected to the same pin.

Returning to FIGS. 1 and 2, a printed circuit board assembly (PCBA) 50 can be secured to the base plate 20. The PCBA 50 can be positioned along a row 31a of locations 31 for the carriers, e.g., between two rows 31a, 31b of carriers. Referring to FIG. 1, each hard disk drive 60 that is held in a carrier 30 can be electrically coupled to the PCBA 50 by a suitable flexible conducting medium, such as flexible data cabling 54. For example, the flexible data cabling 54 can be SATA cabling, e.g., SATA cabling in which wires have been separated into individual strands so as to increase flexibility of the cabling. Alternatively flex cable can be used for power connections. By using flexible data/power cabling 54 rather than plugging the hard disk drive 60 directly into the PCBA backplane, transmission of rotational energy between the hard disk drives 60 can be reduced. Each flexible data cabling 54 can have a first connector 56 plugged into the PCBA 50, and a second connector 57 positioned at one end of a carrier 30 (if a hard disk drive 60 is slotted into the carrier 30, then the second connector 57 will mate to the hard disk drive 60, but if no hard disk drive 60 is present, then the second connector 57 can simply be unattached). Although FIG. 1 illustrates the flexible data cabling 54 at each carrier, some of the carriers need not have the flexible cabling, e.g., the flexible cabling could be attached after the hard disk drive 60 is in place. The PCBA 50 can be secured to the base plate 20 in a "vertical" orientation, i.e., the board is oriented perpendicularly to the face 22 of the base plate 20.

Figure 3:
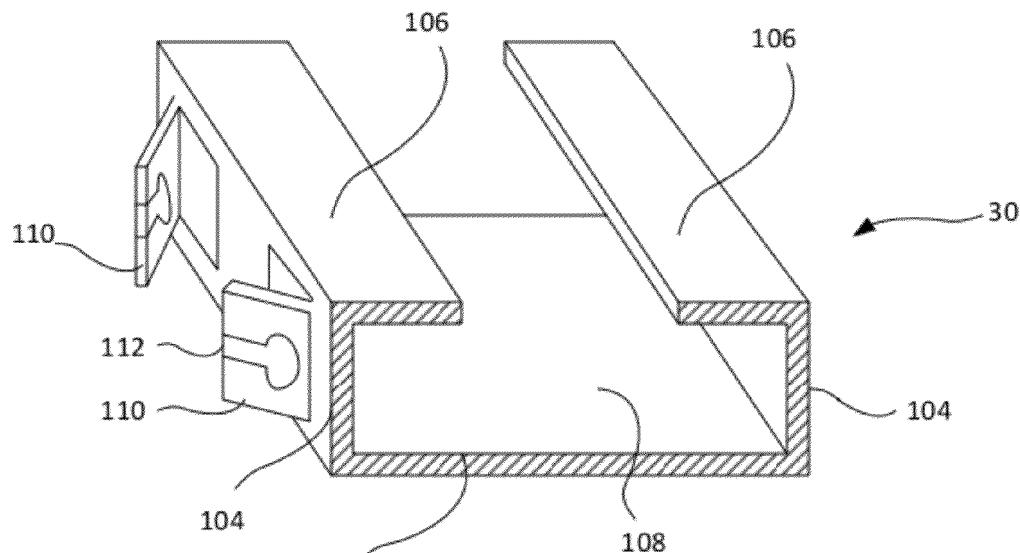
FIG. 3 is a perspective view of a carrier for a hard disk.

Each carrier 30 is configured to receive a hard disk drive 60. In particular, some carriers, e.g., each carrier, can be configured to slidably receive a hard disk drive. In the implementation illustrated in FIG. 3, each carrier can include a bottom plate 102 that will be held substantially parallel to the base plate 20, two opposing side plates 104 extending from opposite sides of the bottom plate 102, and two flanges 106 extending inwardly over the bottom plate from the top edges of the side plates 104. In use, a hard disk drive 60 can be inserted through an open side 108 of the carrier to rest on the bottom plate 102 and fit between the two opposing side plate 104. The open side 108 can be on the side of the carrier opposite the PCBA 50 (see FIG. 1).

Portions of the carrier 30 can make direct contact to opposite sides of the hard disk drive 60 to hold the drive 60. For example, leaf springs, e.g., with a spring rate connection of 30 Hz, can project from various locations on the carrier to contact and hold a hard disk that is inserted into the carrier 30. Since the leaf springs are in series with the isolators 40, they can merely soften the total natural frequency compared to the 15-25 Hz isolator design.

The dimensions of the bottom plate 102 and side plates 104 can be selected based on the form factor of the hard disk drive to be inserted into the carrier 30, e.g., slightly larger (e.g., sized for a flush fit) than 4 in×5.75 in×1 in. if a typical 3.5 inch hard disk drive is to be mounted. If necessary, the hard disk drive 60 can be rigidly secured to the carrier, e.g., by screws inserted through holes in the bottom plate 102 or side plates 104 and into receiving threaded holes in the hard disk drive 60. The second connector 57 of the flexible data cabling 55 can be fixed to the end of the carrier 30 at the opposite side of the open side 108. The second connector 57 can be positioned such that when the hard disk drive 60 is slid into position in the carrier, it blind mates to the connector 57. Alternatively, the connector 57 could be coupled to the hard disk drive 60 after the drive is inserted into the carrier 30.

In some implementations, each carrier further includes multiple vertical tabs 110 orientated at an angle relative to the side plates 104. For example, the tabs 110 can project at an angle from the side plates 104. In some implementations, each tab can project at an angle such that the face of the tab 110 is substantially parallel to a line passing through the center of the carrier 30. In some implementations, the tabs project at a 30-60°, e.g., 45° angle from the side plates 104. The tabs 110 can be used to set the relative orientation of the isolators 40 to provide the desired vibrational isolation characteristics. Each tab 110 can include a horizontal slot 112 which will mate with one end of the isolator 40.

Figure 4:
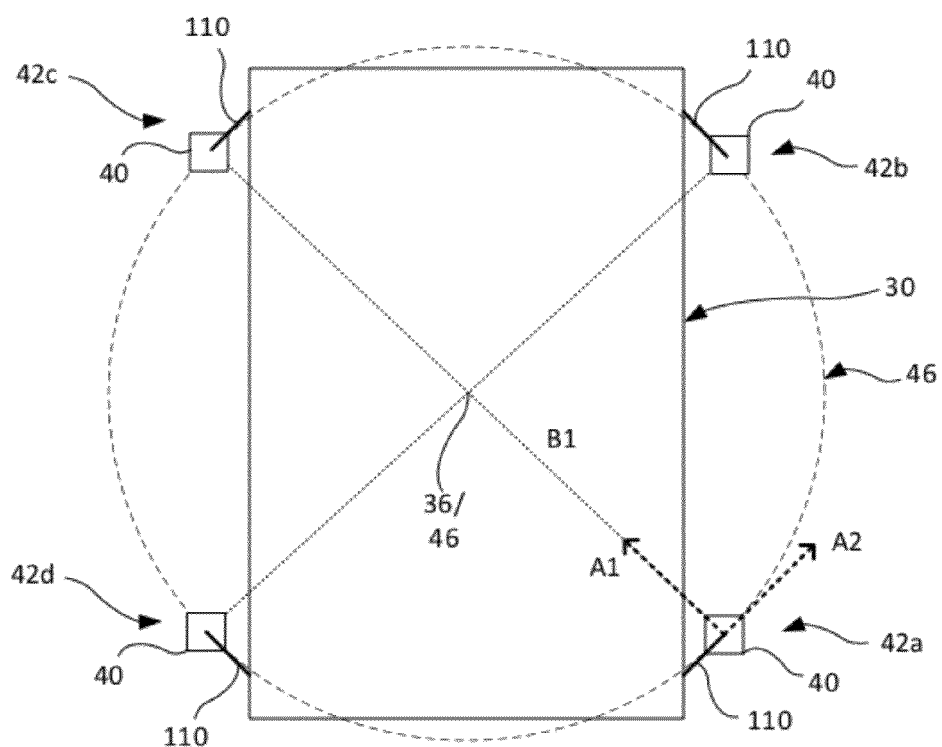
FIG. 4 is a top view of a carrier for a hard disk.

Referring to FIG. 4, the vibration isolating assembly includes a plurality of isolators 40. The plurality of isolators 40 are spaced at different angular positions 42a, 42b, 42c, 42d around a center 36, e.g., a center of mass, of the carrier 30. The isolators 40 can be arranged at points substantially in a circle 46 around a center point 46. The isolators can be located at equal intervals apart, e.g., 90°. The center point 46 can be coincident with the center 36 of the carrier. The isolators 40 can be a flexible material, i.e., more flexible than the base plate 20 and the carrier 30, e.g., plastic. The isolators 40 can be formed by a suitable manufacturing technique, such as injection molding. Each isolator 40 can be secured to an associated tab 110 of the carrier 30.

Each isolator 40 is less flexible, e.g., has a higher spring-constant, along a first axis A1 passing through the connector and the center of the carrier than along a second axis A2 through the isolator that is perpendicular to the first axis and parallel to the base plate. In addition, each isolator 40 is more flexible, e.g., has a lower spring-constant, along the second axis A2 than along a third axis through the isolator that is perpendicular to the base plate, e.g., a vertical axis. The spring constants can be selected to tune the natural vertical vibrational frequency to the desired value, and thus provide isolation at the desired frequency range.

Referring to FIG. 5A, each isolator 40 includes a first end 120, a second end 122, and a flexure 124 connecting the first end 120 to the second end 122. The flexure 124 has a width W that is greater than the thickness T of the flexure 124 (the width is measured in a direction perpendicular to the direction in which the thickness is measured). The flexure 124 can be an S-shaped flexure 124, i.e., having an S-shaped cross-section in the plane perpendicular to the direction in which the width is measured.

Referring to FIGS. 5A and 5B, the first end 120 of the isolator 40 can include a pivotal attachment to the tab 110. For example, the first end 120 of the isolator 40 includes two parallel plates 130 separated by a gap 132. In addition, each plate 130 can include a projection extending inwardly toward (and potentially connecting to) the other plate 130. The second end 122 of the isolator 40 includes a snap-fit feature 136 configured to snap-fit to a pin 38 on the base plate.

Referring to FIG. 5B, in operation, the first end 120 of the isolator 40 can be slid over a tab 110, with the tab 110 fitting into the gap 132, the plates 130 fitting on opposite sides of the tab 110, and the projection fitting into the slot 112 in the tab 110. Once the first end 120 of the isolator 40 is fully engaged with the tab 110, it forms a rotational joint with the tab 110 of the carrier. The isolator 40 can then be rotated about the joint (as shown by arrow C) so that the second end 122 is vertically below the first end 120. In this position, as shown in FIG. 5C, the second end 122 can be snap fit to the pin 38. The snap-fit feature 136 can extend vertically upwardly from the second end 122 when the isolator 40 is snap-fit to the pin 38.

When the isolator 40 is attached to the base plate 20, e.g., snap-fit to the pin 38, the flexure 124 can be oriented so that the rotational joint at the first end of the tab 120 is rotatable about the first axis B1 passing through the connector and the center line of the carrier 30. In addition, the flexure 124 can be oriented so that the width W of the flexure is parallel to the first axis B1. In addition, the flexure 124 can be oriented so that the second end 120 can flex along a second axis B2 that is perpendicular to the first axis B1. Since the width W of the flexure 124 is greater than the thickness T, the flexure is generally more flexible along the second axis B2 than the first axis B1 (axis B2 will be the same as axis A2 and axis B1 will be the same as axis A1 when the isolator 40 is attached between the tab 110 of the carrier 30 and the pin 28 of the base plate 20). The S-shaped flexure 124 can also compress vertically, i.e., along a third axis B3 that is perpendicular to both the first axis B1 and the second axis B2. The length and curvature of the serpentine segments of the flexure 124 can be selected so that the flexure 124 is less flexible, e.g., has a greater spring constant, along the second axis B2 than along the second axis B1. The flexure 124 can be less flexible along the third axis B3 than along the second axis B2. In some implementations, the thickness, length and curvature of the serpentine segments of the flexure 124 can be selected so that the flexure 124 provides isolation of the carrier 30 from lateral vibration at frequencies above 20 Hz.

Returning to FIG. 4, as noted above, each isolator 40 permits the point on the carrier 30 to which it is attached to move along an axis A1 that is generally a perpendicular line through the center of the carrier 30. Since the multiple isolators 40 are spaced at different angular positions around a circle 46, this lateral motion permits the carrier 30 to rotate about the center point 36. Thus, the carrier 30 remains generally isolated from relatively low frequency rotational motion of the base plate 20, and vice versa. On the other hand, lateral motion of the attachment point on the carrier 30 at one isolator will be generally be opposed by one or more isolators are positioned on the far side of the circle 46, e.g., on an opposing sides of the center point 36 of the carrier 30. Consequently, the carrier 30 will be isolated from lateral vibration of the base plate 20, and vice versa, at similar or higher frequencies than the isolation from rotational vibration. In some implementations, the combination of shape and length of the serpentine segments of the flexure 124 with the number and positions of the isolators can be selected so that the carrier is isolated from rotational vibration at frequencies above 30 Hz. In some implementations, the combination of width of the serpentine segments of the flexure 124 with the number and positions of the isolators can be selected so that the carrier is isolated from vertical vibration at frequencies above 40 Hz.

In operation, the normal operation of the hard disk drive 60 will cause some vibration, e.g., vertically, laterally and rotationally, that is generally centered at about the center point 36 of the carrier 30. However, due to the isolators 40, over the isolation range of the isolators (e.g., frequencies above 40 Hz), less vibrational energy is transmitted to the base plate 20. Moreover, for any vibration that is transmitted to the base plate from one hard disk drive 60 (or from another source, such as a fan), even less is transmitted from the base plate 20 to another hard disk drive 60 due to the isolators 40. In addition, even for vibrational energy that is transmitted by the isolators 40, e.g., at the natural frequency of the isolators, the large rotational inertia of the base plate 20 significantly reduces transmission of this energy from one hard disk drive to another. For example, the isolation system can be configured to reduce a drive mounted in a system that is subject to average acceleration of 10 RVrms (in radians/sec$^2$) with most of the energy in a 10 to 2 Khz frequency range, to about 2 RVrms with most of the energy in a 10 to 100 Hz range. Finally, for energy that is transmitted at low frequencies, there are low-cost disk drives available that are less susceptible to vibration energy at frequencies below 50 Hz.

This configuration can improve heat sinking of the hard disk drives 60. Since the carrier 30 is suspended slightly above the base plate 20, air can flow through the gap between the carrier 30 and the base plate 20. Thus, the bottom of the carrier 30 can provide additional surface area to transmit heat away from the hard disk drive 60. A thermal interface material, such as indium can be placed on the top surface of the bottom plate 102 to improve conduction of heat away from the hard disk drive 60 and into the carrier 30. The bottom of the carrier 30 can include fins or other structures to increase radiation of heat away from the carrier 30.

Figure 6:
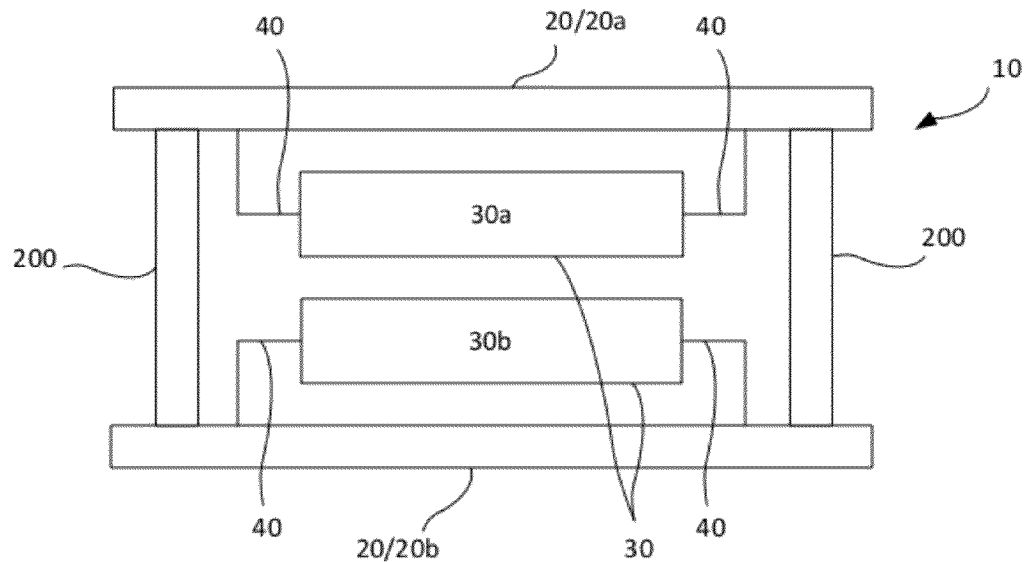
FIG. 6 is a side view of an implementation of a hard disk mounting assembly having two base plates.

In some implementations, as shown in FIG. 6, a disk mounting assembly 10 can include multiple base plates 20, e.g., two base plates, arranged in a parallel and spaced-apart configuration. The base plates 20 can be rigidly secured to each other, e.g., by one or more posts or vertical walls 200. In some implementations, the disk mounting assembly 10 includes a top plate 20a and a bottom plate 20b, with two carriers 30 vertically stacked between the top plate 20a and the bottom plate 20b. As shown in FIG. 6, an upper carrier 30a is connected to and depends from the top plate 20a, and a lower carrier 30b is connected to and supported on the bottom plate 20b.

Each base plate acts as a separate assembly and by linking multiple base plates 20, larger components, such as 60 mm fans, can be included in an assembly. The base plates 20 can be coupled at less than 15 Hz rotationally to have no negative affect from one base to the other or between 37 Hz to 60 Hz rotationally to have a minor affect from one base to the other.

Figure 7:
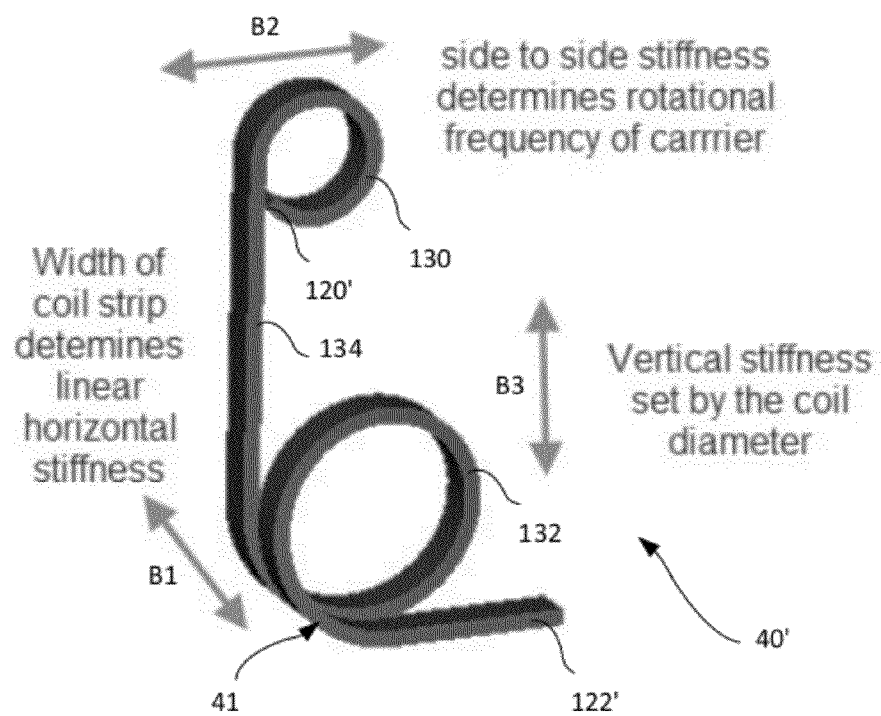
FIG. 7 is a side view of another implementation of an isolator.

Referring to FIG. 7, in some implementations, an isolator 40' can include a coiled spring 41 rather than an S-shaped flexure. The coiled spring 41 can be metal, e.g., steel, and can be a flat band or a round wire that is bent into a coiled configuration. For example, the spring 41 can include a first end 120', a second end 122', an upper coil 130 at the first end 120', a lower coil 132 at the second end 122', and a straight vertical portion 134 between the lower coil 132 and the upper coil 130. The snap feature (from the implementation shown in FIGS. 5A-5C) can be molded to the second end 122' of the spring 41 to provide for attachment of the isolator 40' to the pin 38 on the base plate 20, and similarly the pivotal attachment (from the implementation shown in FIGS. 5A-5C) can be molded to the first end 120' of the spring to provide for attachment of the isolator 40' to the tab 110.

Once attached between the base plate 20 and the carrier 30, upper coil 130 and the lower coil 132 will be coiled about the B1 axis (i.e., about the first axis passing through the isolator and the center of the carrier 30). The width of the spring 41 in the B1 axis can set the stiffness of the isolator 40' in the B1 direction. The diameter of the lower coil 132 and the length of the vertical portion 134 can set the stiffness of the isolator in the B2 direction. The diameter of the upper coil 130 and the lower coil 132 can set the stiffness of the isolator 40' in the B3 direction.

A number of implementations have been described. Nevertheless, it will be understood that various modifications may be made. For example, the carrier 30 can hold 2.5" hard drives. As another example, although the design discussed above uses isolators that are evenly spaced from a center point, an equivalent design can be implemented in which the isolators are at different radial distances, as long as isolators with a different stiffness is used to compensate for the different radial distances. Isolators positioned at equal distances allow for copies of the same part to be used throughout the system. Accordingly, other implementations are within the scope of the following claims.

What is claimed is:

1. A computer component mounting assembly, comprising:
    a base plate;
    a carrier configured to receive a vibration sensitive computer component; and
    a vibration isolation system including three isolators connecting the carrier to the base plate, the three isolators spaced at different angular positions around a central point, wherein the vibration isolation system is configured such that the vibration isolation system has a rotational natural frequency about the central point of less than 45 Hz.

2. The assembly of claim 1, wherein each isolator is less flexible along a first axis passing through the isolator and the central point than along a second axis through the isolator that is perpendicular to the first axis and parallel to the base plate.

3. The assembly of claim 2, wherein each isolator is more flexible along the second axis than along a third axis through the isolator that is perpendicular to the base plate.

4. The assembly of claim 3, wherein each isolator is more flexible along the first axis than along the third axis.

5. The assembly of claim 1, comprising four isolators connecting the carrier to the base plate.

6. The assembly of claim 5, wherein a first pair of the four isolators are positioned on a first side of a center of the carrier, and a second pair of the four isolators are positioned on an opposite second side of the center of the carrier.

7. The assembly of claim 1, wherein the isolators are positioned at equal radial distances from the central point.

8. The assembly of claim 7, wherein the isolators have the same stiffness.

9. The assembly of claim 1, wherein the isolators are at different radial distances from the central point, and the isolators have different stiffness.

10. The assembly of claim 1, wherein the vibration isolation system is configured such that the vibration isolation system has a vertical vibration natural frequency different than the rotational natural frequency and has a lateral vibration natural frequency different than the rotational natural frequency.

11. The assembly of claim 10, wherein the vibration isolation system is configured such that its lateral vibration natural frequency is greater than 20 Hz.

12. The assembly of claim 10, wherein the vibration isolation system is configured such that its vertical vibration natural frequency is greater than 20 Hz.

13. The assembly of claim 1, wherein the vibration isolation system is configured such that the vibration isolation system has a rotational natural frequency about the central point less than 30 Hz.

14. The assembly of claim 1, wherein the vibration isolation system is configured such that the vibration isolation system has a rotational natural frequency about the central point between 15 and 25 Hz.

15. The assembly of claim 1, wherein at least one of the isolators comprises a flexure having an S-shaped cross-section in a plane perpendicular to a first axis passing through the at least one of the isolators and the central point.

16. The assembly of claim 15, wherein the flexure has a width along the first axis and a thickness that is less than the width.

17. The assembly of claim 15, wherein the flexure is a plastic material.

18. The assembly of claim 15, wherein the flexure is steel.

19. The assembly of claim 1, wherein at least one of the isolators comprises a first end pivotal attached to the carrier and a second end attached to the base plate.

20. The assembly of claim 19, wherein the carrier includes three tabs, and the first end of each of the three isolators connects to an associated tab of the three tabs, and each tab of the three tabs is oriented in a plane perpendicular to a first axis passing through an associated isolator and the central point.

21. The assembly of claim 20, wherein each isolator fits to an associated tab with a slide and rotate connection.

22. The assembly of claim 21, wherein the carrier includes a bottom plate and two parallel side plates extending from opposite edges of the bottom plate, and wherein the three tabs extend at an angle from the side plates.

23. The assembly of claim 19, further comprising three pins extending perpendicular from the base plate, and wherein the second end of each of the three isolators connects to an associated pin of the three pins.

24. The assembly of claim 23, wherein each isolator snap fits to an associated pin.

25. The assembly of claim 1, wherein the vibration sensitive computer component comprises a hard disk drive.

26. The assembly of claim 25, wherein the carrier is configured to slidably receive the hard disk drive.

27. The assembly of claim 1, further comprising a printed circuit board secured to the base plate.

28. The assembly of claim 27, wherein the printed circuit board is oriented perpendicular to the base plate.

29. The assembly of claim 27, further comprising flexible power and data cabling connecting an end of the carrier to the printed circuit board.

30. The assembly of claim 1, wherein the vibration isolation system suspends the carrier above the base plate such that air can flow through a gap between the carrier and the base plate.

31. The assembly of claim 30, further comprising a thermal interface material to improve conduction of heat from the vibration sensitive computer component mounted in the carrier to the carrier.

32. The assembly of claim 30, wherein a plurality of fins project from the carrier into the gap.

33. The assembly of claim 1, wherein the central point comprises a geometric center of the carrier.

34. The assembly of claim 1, wherein the central point comprises a center of mass of the carrier and vibration sensitive computer component.

35. The assembly of claim 1, comprising:
a plurality of carriers, each carrier of the plurality of carriers configured to receive a hard disk drive; and
a plurality of sets of isolators, each set of isolators including three isolators connecting an associated carrier of the plurality of carriers to the base plate, the three isolators spaced at different angular positions around a center of the associated carrier, each isolator being less flexible along a first axis passing through the isolator and the center of the associated carrier than along a second axis through the isolator that is perpendicular to the first axis and parallel to the base plate.

36. A hard disk mounting assembly, comprising:
a base plate;
a carrier;
a hard disk drive inserted in the carrier, the hard disk drive having a maximum spindle speed; and
a vibration isolation system including three isolators connecting the carrier to the base plate, the three isolators spaced at different angular positions around a central point, wherein the vibration isolation system is configured such that the vibration isolation system has a rotational natural frequency about the central point equal to or less than one half of the maximum spindle speed of the hard disk drive.

37. A computer component mounting assembly, comprising:
a base plate;
a carrier configured to receive a vibration sensitive computer component; and
three springs connecting the carrier to the base plate, the three springs spaced at different angular positions around a central point, each spring having a first spring constant in the first axis passing through the connector and the central point and a second spring constant in a second axis that is perpendicular to the first axis and parallel to the base plate, the first spring constant being greater than the second spring constant.

38. A vibration isolation system, comprising:
a base plate; and
three isolators connected to the base plate to support a carrier that receives a vibration sensitive computer component, the three isolators spaced at different angular positions around a central point, wherein the isolators are configured to have a rotational natural frequency about the central point of less than 45 Hz.

39. A hard disk mounting assembly, comprising:
a base plate having a top surface and four pins projecting perpendicularly from the top surface;
a printed circuit board secured to the base plate;
a carrier configured to receive a hard disk drive, the carrier including four tabs;
flexible power and data cabling connecting an end of the carrier to the printed circuit board; and
a vibration isolation system including four isolators connecting the carrier to the base plate, the four isolators spaced at different angular positions around a central point, wherein each isolator of the four isolators comprises a flexure having an S-shaped cross-section in a plane perpendicular to a first axis passing through the isolator and the central point, wherein the flexure has a width along the first axis and a thickness that is less than the width, wherein a first end of each isolator fits to an associated tab of the four tabs with a slide and rotate connection, wherein a second end of each isolator snap fits to an associated pin of the four pins, wherein the vibration isolation system is configured such that the vibration isolation system has a rotational natural frequency about the central point less than 45 Hz, and wherein the vibration isolation system is configured such that its vertical vibration natural frequency is greater than 20 Hz.

* * * * *

UNITED STATES PATENT AND TRADEMARK OFFICE
CERTIFICATE OF CORRECTION

PATENT NO. : 8,325,474 B2
APPLICATION NO. : 13/071406
DATED : December 4, 2012
INVENTOR(S) : Jeffrey S. Spaulding, Everildo Guia Aguilar and Michael Chi Kin Lau Page 1 of 1

It is certified that error appears in the above-identified patent and that said Letters Patent is hereby corrected as shown below:

In the Claims:

Claim 37, Column 12, Line 9 – before "first axis" delete "the" and insert -- a --.

Signed and Sealed this
Sixteenth Day of April, 2013

Teresa Stanek Rea
*Acting Director of the United States Patent and Trademark Office*